United States Patent [19]
Ogawa et al.

[11] 4,402,595
[45] Sep. 6, 1983

[54] SCANNING TYPE IMAGE FORMATION APPARATUS

[75] Inventors: Hiroshi Ogawa; Tateki Nagaoka; Yoshikuni Tohyama, all of Yokohama, Japan

[73] Assignee: Canon Kabushiki Kaisha, Tokyo, Japan

[21] Appl. No.: 245,097

[22] Filed: Mar. 18, 1981

[30] Foreign Application Priority Data

Mar. 25, 1980 [JP] Japan ................................. 55-37835
Apr. 18, 1980 [JP] Japan ................................. 55-51422

[51] Int. Cl.³ ...................... G03G 15/00; G03G 15/28
[52] U.S. Cl. ............................................ 355/8; 355/11
[58] Field of Search .................. 355/8, 3 R, 14 R, 60, 355/11, 66, 47

[56] References Cited
U.S. PATENT DOCUMENTS 4,120,578 10/1978 Daniels et al. ........................ 355/8
4,126,389 11/1978 Ikeda et al. ........................ 355/8 X
4,155,641 5/1979 Sagara et al. ........................ 355/8
4,196,455 4/1980 Brooke ................................ 355/8 X Primary Examiner—A. C. Prescott
Attorney, Agent, or Firm—Fitzpatrick, Cella, Harper & Scinto

[57] ABSTRACT

A scanning type image formation apparatus capable of selectively changing image magnifications is provided with a mirror for scanning an original, movable support means for supporting the mirror, a moving member to which a drive force transmitting member is connected and which is caused to move along a predetermined path for scanning of the original by the drive force transmitted by the drive force transmitting member, connecting means for connecting to the moving member the movable support means supporting the mirror, and means for changing the connected position of the movable support means to the moving member to change the length of the light path correspondingly to a selected magnification.

21 Claims, 18 Drawing Figures

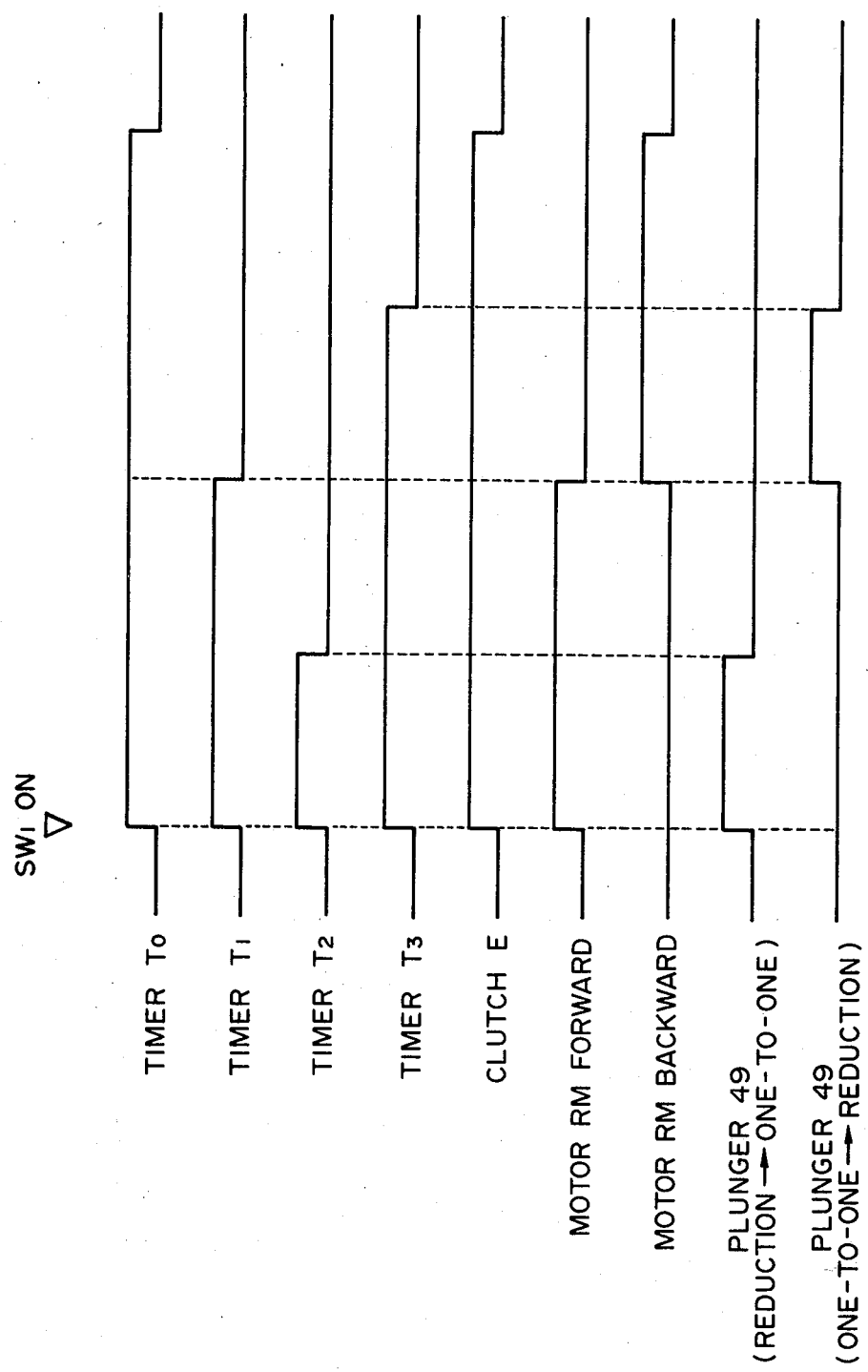

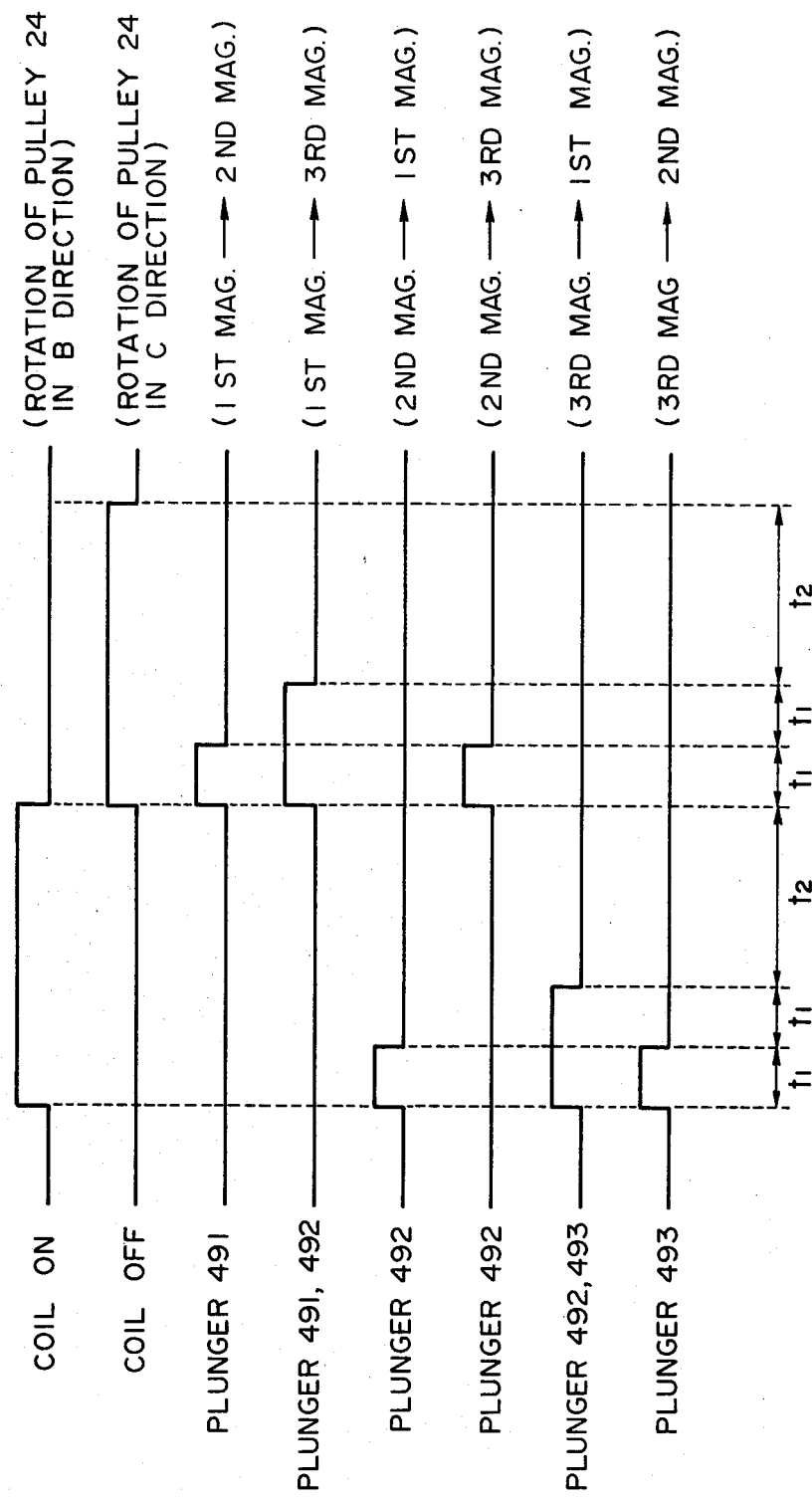

SCANNING TYPE IMAGE FORMATION APPARATUS

BACKGROUND OF THE INVENTION

1. Field of the Invention

This invention relates to a scanning type image formation apparatus capable of selectively changing image magnifications.

2. Description of the Prior Art

To change an image magnification, it is necessary to change the length of the light path correspondingly to a selected magnification. To change the length of the light path, it is generally practised to change the position of a movable mirror for scanning an original. Scanning type image formation apparatuses provided with such a device for changing the length of the light path are described in U.S. Pat. Nos. 3,614,222; 3,884,574; 3,914,044 and 4,168,905 and Japanese Patent Publication No. 34731/1976. These patents disclose different light path length changing devices, but these devices are common in that the position of a portion of a wire for transmitting a drive force to the movable mirror for scanning an original is changed by magnification changing operation, whereby changing the position of the mirror.

A drive force for moving the mirror to scan the original is applied to the wire, but the known devices in which the position of a portion of the wire is changed to change the length of the light path, as described above, actually require a complicated mechanism for preventing said drive force from imparting an adverse effect to wire position changing means to cause an error in the length of the light path or for preventing the wire position changing means from acting on the drive force to cause fluctuation of the original scanning velocity. This has also precluded the compactness of the apparatuses.

SUMMARY OF THE INVENTION

It is a primary object of the present invention to overcome the above-noted disadvantages peculiar to the known apparatuses.

It is another object of the present invention to enable accurate change of the length of the light path.

It is still another object of the present invention to enable original scanning at an accurate velocity in each magnification.

It is yet still another object of the present invention to enable the length of the light path to be changed by a simple construction.

Other objects and features of the present invention will become apparent from the following detailed description of the invention taken in conjunction with the accompanying drawings.

BRIEF DESCRIPTION OF THE DRAWINGS

FIG. 7B illustrates the operation timing of the FIG. 7A circuit.

FIG. 9C illustrates the operation timing of the FIG. 9A circuit.

DESCRIPTION OF THE PREFERRED EMBODIMENTS

Figure 1:
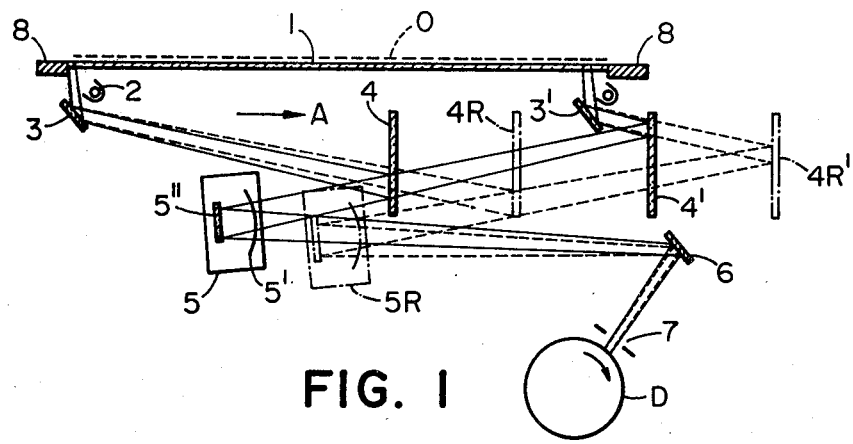
FIG. 1 illustrates an example of the copying apparatus to which the present invention is applicable.

Referring to FIG. 1, an original O placed on an original carriage glass 1 fixed to an immovable member 8 of a copying apparatus body by well-known means is illuminated by an illuminating lamp 2 and scanned by a first mirror 3 moved with the lamp 2 in the direction of arrow A parallel to the glass 1 and a second mirror 4 moved at ½ of the velocity of the first mirror 3 in the same direction. Thus, the light beam from the original reflected by the mirrors 3 and 4 enters an in-mirror lens 5 comprising a lens 5' and a mirror 5" and emerges from this in-mirror lens 5, whereafter it is reflected by a stationary mirror 6 and passes through a slit to an electrophotographic photosensitive drum D rotating in the direction of arrow. That is, the optical image of the original O scanned by the mirrors 3 and 4 moved in the direction of arrow A is formed on the drum D by the in-mirror lens 5. Thereby, an electrostatic latent image of the original O is formed on the drum D. Along the rotational path of the electrophotographic photosensitive drum D, a charger, a developing device, an image transfer device and a cleaning device are disposed as is well-known, and a copy image of the original O is obtained on transfer paper through a well-known electrophotographic process. The mirrors 3 and 4 are moved to positions 3' and 4', respectively, and when their scanning of the original is terminated, they are moved in the direction opposite to the arrow A and return to their start positions indicated at 3 and 4. It is for the purpose of maintaining the length of the light path between the original O and the lens 5 constant during the scanning of the original that the mirrors 3 and 4 are moved at the velocity ratio of 1:½ as described above.

In FIG. 1, the mirror positions indicated at 3 and 4 are the start positions of the first and second mirrors during one-to-one magnification copying. By a copying magnification changing operation, the start position of the second mirror is changed to a position 4R to change the length of the light path between the original and the lens correspondingly to a selected magnification. To change the length of the light path between the original and the lens and the length of the light path between the lens and the photosensitive medium correspondingly to the selected magnification, the lens is also moved from the position 5 to a position 5R during the copying magnification change. Such movement of the lens may be accomplished by a well-known position changing means. When the lens is at the position 5 and the start position of the second mirror is 4, a one-to-one magnification image of the original is projected upon the drum D, and when the lens is at the position 5R and the start position of the second mirror is 4R, a reduced image of the original is projected upon the drum D. The start position of the second mirror is changed as described above to maintain the original O and the drum D in an optically conjugate relation corresponding to a selected magnification both when the lens is at the position 5 and when the lens is at the position 5R. (The terminus of the forward movement of the second mirror when its start position is 4R is a position 4R'. Also, irrespective of the start position of the second mirror, the second mirror is moved at ½ of the velocity of the first mirror and in the same direction as the first mirror, during the scanning of the original.)

Figure 2:
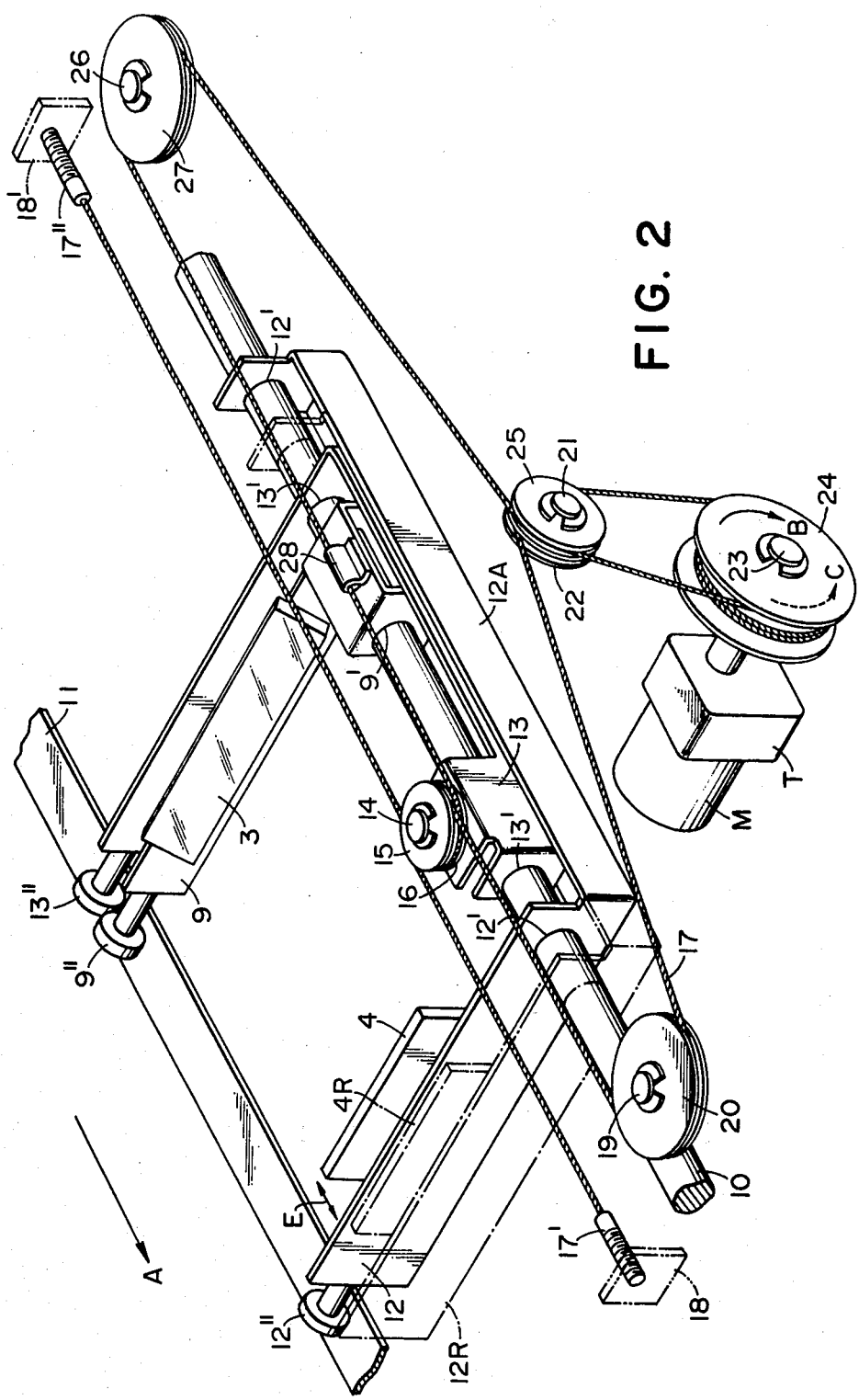
FIG. 2 illustrates the scanning device according to an embodiment of the present invention.

FIG. 2 is a perspective view of the original scanning device as seen from a position corresponding to a point behind and upward of the plane of the drawing sheet of FIG. 1. In FIG. 2, the first mirror 3 is secured to a first mirror carriage 9 which is designed to be smoothly slidable on a guide shaft 10. That is, the carriage 9 has a bore 9' formed in the bent portion thereof this bore 9' is slidably fitted on the guide shaft 10. The second mirror 4 is secured to a second mirror carriage 12 which is also smoothly slidable on the guide shaft 10. That is, the carriage 12 has a bore 12' at one end thereof and this bore 12' is slidably fitted on the guide shaft 10. A pulley carriage 13 is disposed on the guide shaft 10 and this is also designed to be smoothly slidable on the guide shaft 10. That is, the carriage 13 is formed with a bore 13', which is slidably fitted on the guide shaft 10. Pulleys 15 and 16 are mounted for rotation relative to each other on a shaft 14 studded in the carriage 13. Rollers 9", 12" and 13" are provided on the ends of the carriages 9, 12 and 13, respectively, and are rollably placed on a guide plate 11. The guide shaft 10 and the guide plate 11 are fixed parallel to the original carriage 1. Accordingly, the mirrors 3, 4 and the pulleys 15, 16 are reciprocally movable in parallel to the original carriage 1.

One end of wire 17 is fixed to an immovable member 18 of the apparatus body by means of a screw 17' provided on said one end. This wire 17 is passed over the pulley 15, a pulley 20 rotatably supported on a shaft 19 provided at a fixed position, a pulley 22 rotatably supported on a shaft 21 provided at a fixed position, a pulley 24 fixed to a shaft 23 rotatably provided at a fixed position, a pulley 25 rotatably supported on the shaft 21, a pulley 27 rotatably supported on a shaft 26 provided at a fixed position, and the pulley 16. The other end of the wire is fixed to an immovable member 18' of the apparatus body by means of a screw 17" provided on said other end. The wire 17 has a portion thereof between the pulley 27 and the pulley 16 secured to the first mirror carriage 9 by means of a set member 28. As shown, the direction in which the wire 17 is passed over the pulley 15 is opposite to the direction in which the wire 17 is passed over the pulley 16. The portions of the wire 17 between the end 17' and the pulley 15, between the pulley 15 and the pulley 20, between the pulley 27 and the pulley 16 and between the pulley 16 and the end 17" extend substantially parallel to the guide shaft 10.

The pulley shaft 23 is connected to a motor M through a well-known velocity changing mechanism T comprising a plurality of clutches and a plurality of gears. During the original scanning for one-to-one magnification copying, the pulley 24 is rotated in the direction of arrow B by operation of the motor M and one of the plurality of clutches and the rotation of this pulley 24 drives the wire 17 so that the first mirror carriage 9 and the pulley carriage 13 move parallel to the original carriage 1 at a velocity ratio of 1:½. Due to the operation of said clutch, the velocity of forward movement of the first mirror carriage 9 at this time is equal to the peripheral velocity of the photosensitive drum D. Also, during the original scanning for reduction copying, the pulley 24 is rotated in the direction of arrow B at a velocity different from that during one-to-one magnification copying by operation of the motor M and another one of the plurality of clutches, whereby the first mirror carriage 9 is moved forward at a velocity equal to the peripheral velocity of the drum D divided by the image magnification and the pulley carriage 13 is moved forward at ½ of that velocity. Both during one-to-one magnification copying and during reduction copying, when the original scanning is terminated, still another one of the plural clutches is operated to rotate the pulley 24 in the direction of arrow C and return the carriages 9 and 13 to their respective start positions. If a reversible motor, for example, a DC motor, is used as the motor M, the aforementioned clutches for backwardly moving the carriages will be unnecessary. In this case, if the input to the DC motor is changed to rotate the motor in reverse direction, each carriage can be returned to its start position.

Although, in FIG. 2, the pulleys 15 and 16 are mounted on a common shaft, they may also be mounted on distinct shafts. This also holds true of the pulleys 22 and 25. Also, if the direction opposite to the direction of arrow A is the original scanning direction, that is, if design is made such that the original is scanned when the pulley 24 has been rotated in the direction C, the portion of the wire from the end 17' via the pulleys 15, 20, 22 to the pulley 24 will be unnecessary. Accordingly, in such case, the pulleys 15, 20, 22 will be unnecessary. In this case, backward movement of the mirrors 3 and 4 may be accomplished by a tension spring having one end secured to the second mirror carriage 12 and the other end secured to an immovable member in the apparatus body.

Now, the drive pulleys 15, 16 for forwardly moving the second mirror 4 at ½ of the velocity of the first mirror 3 are provided not on the second mirror carriage 12 but on the pulley carriage 13. The second mirror carriage 12 is movable relative to the pulley carriage 13, as indicated by arrow E, along the guide shaft 10 and the guide plate 11. When the pulley 24 is rotated to drive the wire 17 after the carriage 12 has been fixed relative to the carriage 13 in a positional relation corresponding to a selected magnification by a connecting means to be described, the second mirror carriage 12 is moved with the pulley carriage 13. Thus, the second mirror 4 is moved at ½ of the velocity of the first mirror 3 in the same direction as the first mirror.

Figure 3A:
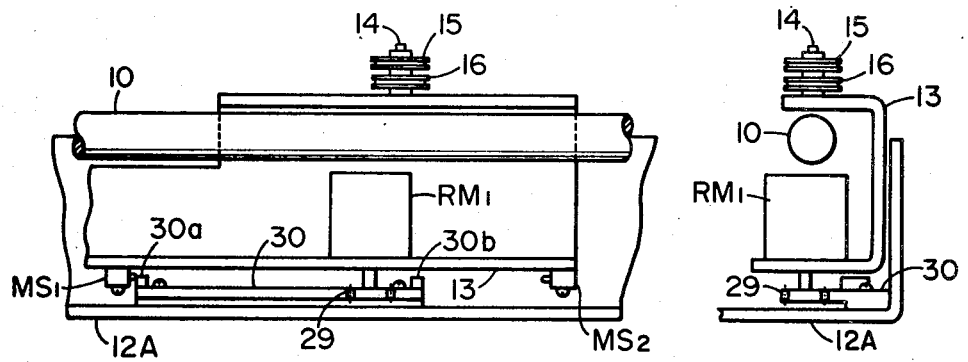
FIGS. 3A and 3B are a side view and a cross-sectional view, respectively, of a portion of the FIG. 2 device.
Figure 3B:
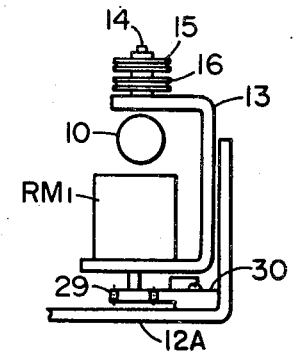

An example of the connecting means for the carriages 12 and 13 is shown in FIGS. 3A and 3B. In these Figures, a pinion 29 is secured to the output shaft of a reversible motor $RM_1$ which in turn is secured to the pulley carriage 13 and the pinion 29 is in mesh engagement with a rack 30 secured to the side plate portion 12A of the carriage 12 which is parallel to the guide shaft 10. As shown in FIG. 2, as long as the motor M is not rotated, the wire 17 remains unmoved and the positions of the pulley carriage 13 and the first mirror carriage 9 remain unchanged. Accordingly, when the motor $RM_1$ is rotated, the rack 30 can be moved along the guide shaft 10 with the position of the pulley carriage 13 remaining unchanged. In other words, the second mirror carriage 12 has its position relative to the pulley carriage 13 changed on the guide shaft 10. Accordingly, the second mirror carriage 12 has its position relative to the first mirror carriage 9 also changed. That is, as described in connection with FIG. 1, the start position of the second mirror 4 is change relative to the start position of the first mirror 3 and therefore, the length of the light path between the original and the lens is changed to a length corresponding to the selected magnification.

Normally closed microswitches $MS_1$ and $MS_2$ are secured to the pulley carriage 13 and may be actuated by projected members 30a and 30b provided at the opposite ends of the rack 30. When the microswitch $MS_1$ or $MS_2$ is actuated, the motor $RM_1$ stops rotating. Accordingly, the positions whereat the microswitches $MS_1$ and $MS_2$ are mounted may be set to positions corresponding to the respective magnifications. Even when the microswitches are actuated, the rack 30 and the pinion 29 are in mesh engagement with each other and therefore, with the rotation of the drive pulley 24, the second mirror carriage 12 and the pulley carriage 13 are moved together as if they were constructed integrally with each other. When the microswitch $MS_2$ is actuated by the projected member 30b, the start position of the second mirror carriage 12 is a position 12R indicated in FIG. 2 and the start position of the second mirror at this time is 4R in FIG. 1. Also, when the microswitch $MS_1$ is actuated by the projected member 30a, the start position of the second mirror carriage is a position 12 indicated in FIG. 2 and the start position of the second mirror at this time is 4 in FIG. 1. After such operation of changing the length of the light path has been terminated, the pulley 24 is driven for original scanning.

Figure 4A:
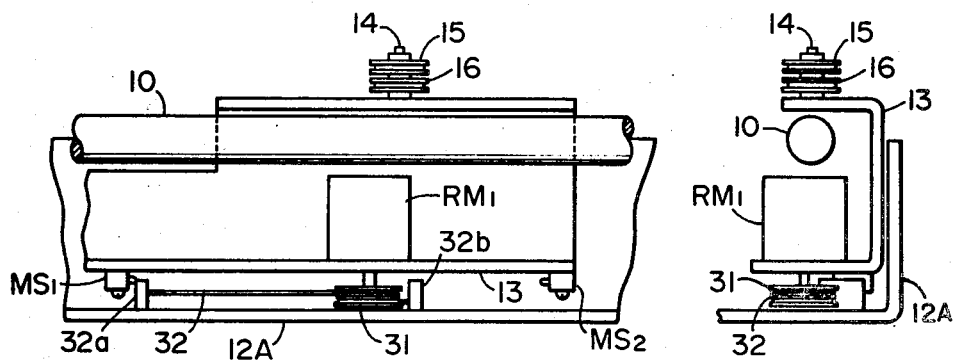
FIGS. 4A and 4B are a side view and a cross-sectional view, respectively, of a portion of another example of the FIG. 2 device.
Figure 4B:
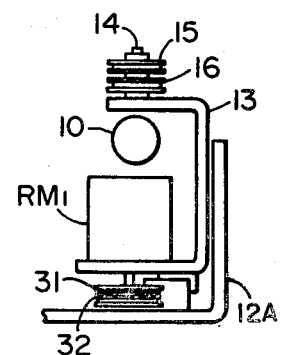

In the example shown in FIGS. 4A and 4B, a drive pulley 31 instead of the pinion 29 in FIGS. 3A and 3B is secured to the output shaft of the reversible motor $RM_1$ and wire 32 is wound several turns on the pulley 31, one end of the wire being fixed to a projected member 32a secured to a second mirror carriage side plate 12A and the other end of the wire being also fixed to a projected member 32b secured to a side plate 12A. As described in connection with FIGS. 3A and 3B, as long as the drive pulley 24 is not rotated, the position of the pulley carriage 13 remains unchanged and therefore, when the pulley 31 is rotated with rotation of the motor $RM_1$, the second mirror carriage 12 is displaced along the guide shaft 10 by the wire 32. Normally closed microswitches $MS_1$ and $MS_2$ may be actuated by the aforementioned projected members 32a and 32b, respectively. When one of the microswitches is actuated, the motor $RM_1$ stops rotating and the movement of the second mirror carriage 12 is terminated. In this manner, the positional relation of the second mirror relative to the first mirror corresponding to the actuated position of each microswitch provided at a position corresponding to each copying magnification is ensured. In this condition, when the drive pulley 24 is rotated, the pulley carriage 13 and the second mirror carriage 12 are moved together to effect original scanning.

Figure 5:
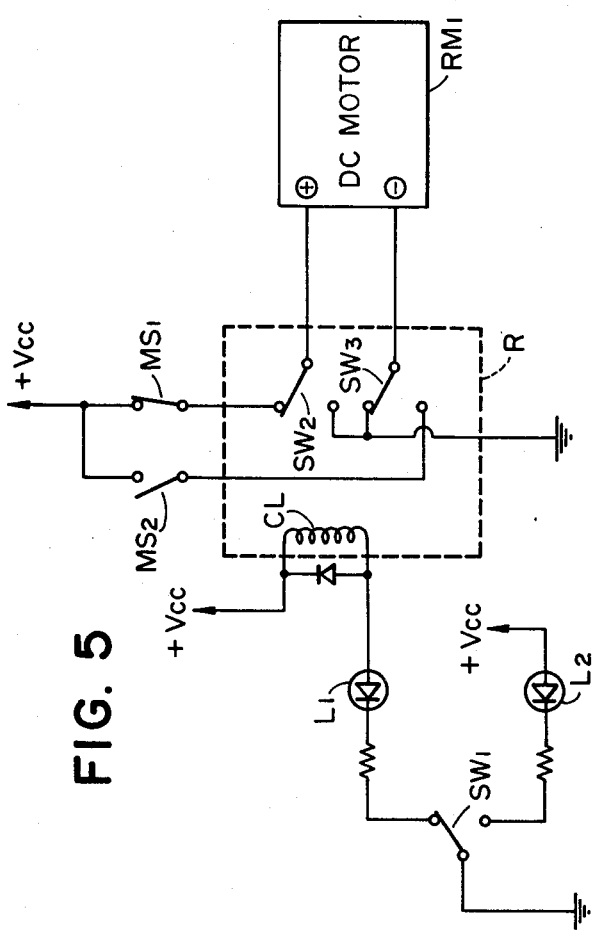
FIG. 5 illustrates the control circuit of the FIG. 2 device.

Means for controlling the rotation of the motor $RM_1$ by magnification changing operation in FIGS. 3A, 3B, 4A and 4B is shown in FIG. 5. In FIG. 5, SW1 is a copying magnification selecting switch. When the upper contact of this switch is closed, the start position of the second mirror is brought to the position 4 in FIG. 1 and, when the lower contact of this switch is closed, the start position of the second mirror is brought to the position 4R in FIG. 1. More particularly, assume that the copying mode is changed from the reduction copying mode to the one-to-one magnification copying mode. In the reduction copying mode, the switch SW1 is closed at its lower contact and a light-emitting diode $L_2$ emits light to indicate the reduction copying mode. The normally closed microswitch $MS_2$ is opened by the projected member 30b or 32b while the microswitch $MS_1$ remains closed.

$SW_2$ and $SW_3$ are switches which are normally closed at their lower contacts, and they are closed at their upper contacts only when the coil CL of a relay R is energized. In the reduction copying mode, the switches $SW_2$ and $SW_3$ are closed at their lower contacts.

When the switch $SW_1$ is closed at its upper contact as shown in FIG. 5, a light-emitting diode $L_1$ emits light while, at the same time, the coil CL is energized and the switches $SW_2$ and $SW_3$ are closed at their upper contacts. At this time, the microswitch $MS_1$ is closed and therefore, a forward input is applied to the DC motor $RM_1$, which thus rotates forward. Thus, when the second mirror carriage 12 and accordingly the second mirror 4 are moved to their start position for one-to-one magnification copying, the projected member 30a or 32a actuates the microswitch $MS_1$ so that this microswitch $MS_1$ is opened. Thus, the rotation of the motor $RM_1$ is stopped, and the movement of the carriage 12 and accordingly of the mirror 4 is also stopped. (The microswitch $MS_2$ is closed at a point of time whereat the projected member 30b or 32b becomes disengaged from the microswitch $MS_2$ by the movement of the carriage 12.)

To change the mode from the one-to-one magnification copying mode to the reduction copying mode, the switch $SW_1$ is closed at its lower contact. Thereupon, the relay R is deenergized and the switches $SW_2$ and $SW_3$ are closed at their lower contacts while, at this time, the microswitch $MS_2$ is closed and the microswitch $MS_1$ is opened, so that the DC motor $RM_1$ now rotates in the opposite direction. When the second mirror reaches its start position 4R for reduction copying, the microswitch $MS_2$ is opened to deenergize the motor $RM_1$.

Figure 6B:
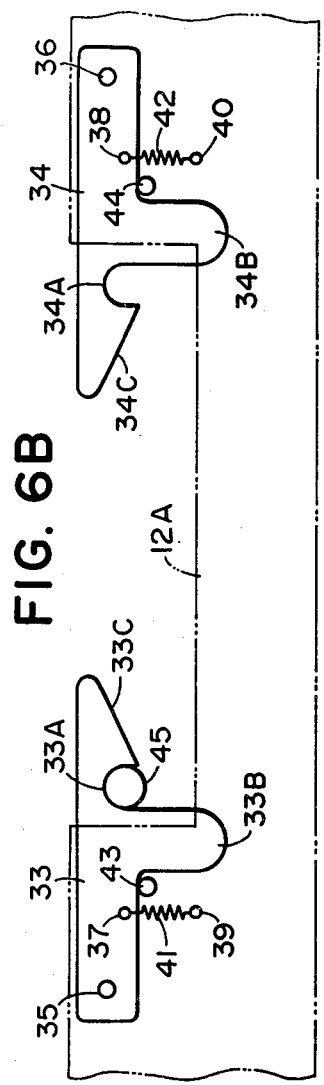
FIG. 6B is a side view of a portion of the FIG. 6A device.
Figure 6A:
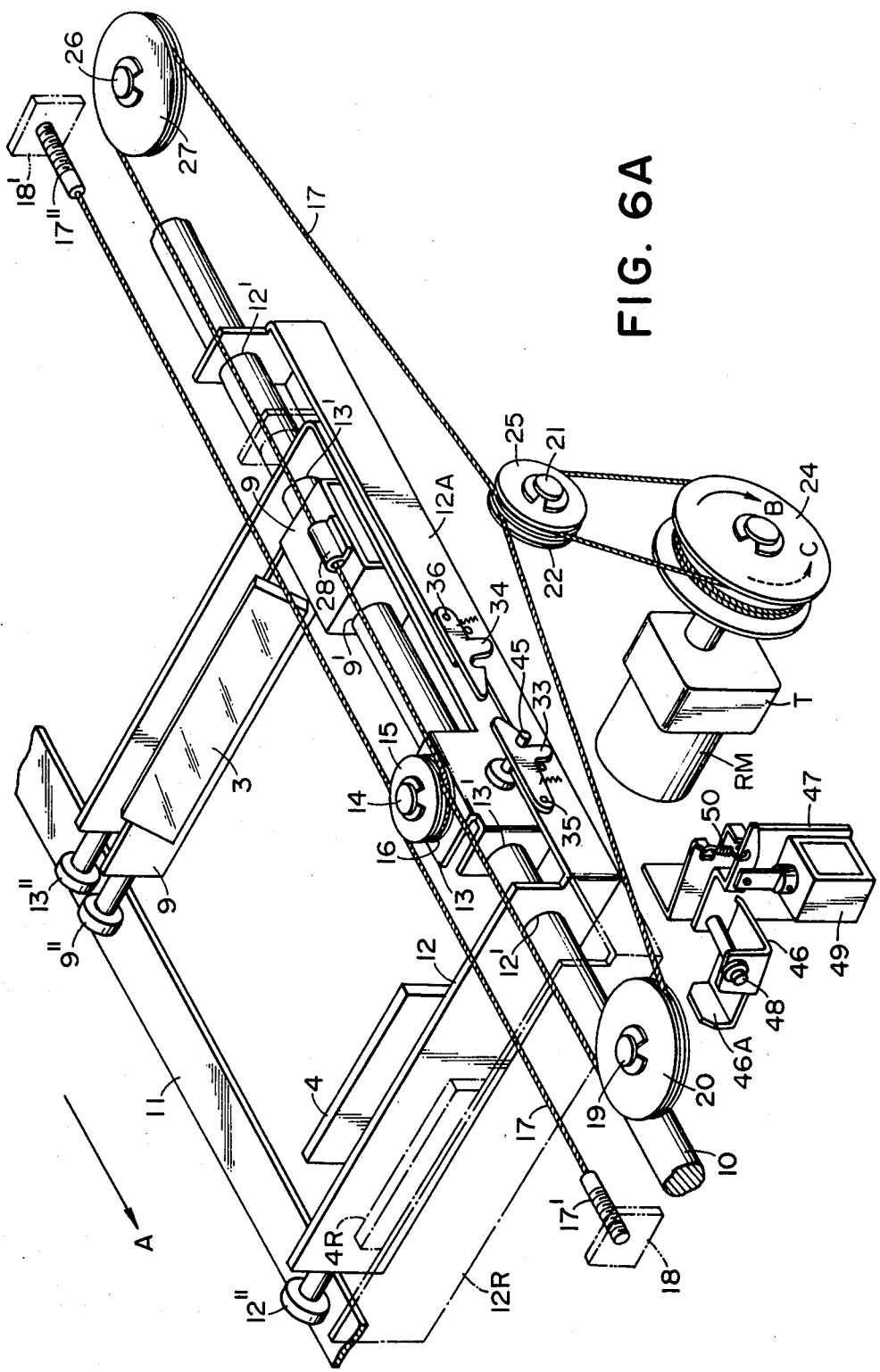
FIG. 6A illustrates the scanning device according to still another embodiment of the present invention.

In the embodiment of FIGS. 6A and 6B, change of the length of the light path is also accomplished by the DC motor RM for reciprocally moving the mirrors 3 and 4 for original scanning. (No clutch and gear for moving the mirrors backward are necessary in the velocity changing mechanism T. To effect backward movement of the mirrors, the direction of the input to the DC motor RM may be reversed from that during forward movement of the mirrors.)

In FIGS. 6A and 6B, hook plates 33 and 34 are pivotally supported on shafts 35 and 36 studded in the side plate 12A of the second mirror carriage 12. The hook plates 33 and 34 are pivotally biased by springs 41 and 42 extending between and secured to pins 37, 38 studded in the hook plates 33, 34 and pins 39, 40 studded in the carriage side plate 12A. That is, the hook plate 33 is biased for clockwise rotation and the hook plate 34 is biased for counter-clockwise rotation, but they are restrained in substantially horizontal position by pins 43 and 44 studded in the carriage side plate 12A. The hook plates 33 and 34 respectively have therein hook grooves 33A, 34A, projected portions 33B, 34B and inclined surface portions 33C, 34C. The hook grooves 33A, 34B can be fitted on a pin 45 secured to the pulley carriage 13.

Describing more fully, in the case of the original scanning in the one-to-one magnification copying mode, the groove 33A of the first hook member 33 is engaged with the pin 45 to make the pulley carriage 13 and the second mirror carriage 12 integral with each other, and the first mirror 3 and the second mirror 4 are moved at the velocity ratio of 1:½ in their aforementioned relative positional relation by the reversible motor RM. On the other hand, during the reduction copying, the groove 34A of the second hook member 34 is engaged with the pin 45. The start position of the second mirror in this condition is the aforementioned position 4R. Thus, by the rotation of the motor RM, the pulley carriage 13 and the second mirror carriage 12 are moved together while maintaining a new relative positional relation therebetween.

Where the mode is to be changed from the one-to-one magnification copying mode to the reduction copying mode, before the exposure scanning for the reduction copying is started, idle scanning is first effected and the relative positional relation between the first mirror 3 and the second mirror 4 is changed to that for the reduction copying. (The term "idle scanning" used herein refers to the operation in which the pulley 24 is rotatively driven to reciprocate at least the first mirror carriage 9 and the pulley carriage 13 over a certain section but no copy is produced thereby. During the idle scanning, the lamp 2 need not be turned on.) By the above-described idle scanning, one of the first and second hook members 33 and 34 that is connected to the pin 45 is liberated from the pin 45, and then the other hook member is connected to the pin 45. An example of the means for liberating the hook member from the pin 45 will now be described.

In FIG. 6A, a cam 46A is integrally provided on the end of a lever 46. The cam 46A selectively goes in and out of the movement path of the projected portions 33B and 34B at a predetermined position between the forward movement starting point and the forward movement terminating point of the projected portions 33B, 34B when the pulley 24 is rotated in the direction B and the hook members 33, 34 move forward with the second mirror carriage 12. The mechanism for causing the cam to go in and out is designed as follows. The lever 46 is pivotally supported on a shaft 48 studded in an immovable plate 47 within the apparatus body. At a location opposite from the cam 46A with respect to the shaft 48, an electromagnetic plunger 49 and a tension spring 50 having one end thereof restrained by the immovable plate 47 are coupled to the lever 46. Accordingly, when the plunger 49 is in its deenergized condition, the cam 46A is retracted from said path by the resilient force of the spring 50, but when the plunger 49 is electrically energized, it causes the cam 46A to jut into said path against the force of the spring 50. When the aforementioned projected portion of the hook member engages the cam 46A that has jutted into said path, the projected portion is pushed up by the cam 46A with the movement of the hook member along the guide shaft 10, so that the hook member is rotated about said shaft against the force of said spring to a position whereat said hook groove is completely liberated from the pin 45. On the other hand, when the pin 45 comes, with the pulley carriage 13, to the hook member which is not acted on by the cam 46A, the pin 45 engages the aforementioned inclined surface portion of the hook member. The pin 45 further moves toward the hook groove of the hook member while pushing up said inclined surface portion and accordingly rotating the hook member about said shaft against the force of said spring, and at last the pin 45 arrives at the hook groove. Thereupon, the hook member is rotated in the opposite direction by the spring and the hook groove is positively connected to the pin 45.

In the one-to-one magnification copying mode, the first hook member 33 is connected to the pin 45 and in the reduction copying mode, the second hook member 34 is connected to the pin 45. Where the mode is changed from the one-to-one magnification copying mode to the reduction copying mode, the plunger 49 is not electrically energized during the idle scanning forward movement, namely, the movement in the direction of arrow A, of the first and second mirror carriages 9 and 12 and the pulley carriage 13, and the plunger 49 is electrically energized after a point of time whereat the drive pulley 24 starts to be rotatively driven in the direction of arrow C, namely, after a point of time whereat the aforementioned three carriages have started their backward movement, and the cam 46A is inserted into the movement path of the first and second hook members 33 and 34. With the movement of the pulley carriage 13 and the second mirror carriage 12 in the direction opposite to the direction of arrow A, the second hook member 34 that is not connected to the pin 45 is first raised upwardly by the cam 46A. The first hook member 33 that is engaged with the pin 45 is then raised by the cam 46A, so that the first hook member 33 is liberated from the pin 45. By this, the second mirror carriage 12 is disconnected from the pulley carriage 13 and its movement is stopped, while the pin 45 moves in the backward direction, namely, toward the second hook member 34, and becomes connected to the hook groove 34C of the second hook member 34 in the manner previously described. Thus, the second mirror carriage 12 again starts its backward movement and when it has returned to its forward movement starting position, the second mirror and the second mirror carriage come to lie at the positions 4R and 12R, respectively, of FIG. 4.

Description will now be made of the reverse case, namely, the case where the mode is changed from the reduction copying mode to the one-to-one magnification copying mode. Again in this case, idle scanning is effected to change the length of the light path. At or after the start of the forward movement of the first mirror carriage 9, the pulley carriage 13 and the second mirror carriage 12, the aforementioned plunger 49 is electrically energized and the cam 46A is inserted into the movement paths of the first and second hook members 33 and 34. With the scanning in the direction of arrow A, the first hook member 33 first arrives at the position of the cam 46A, but since this first hook member is not engaged by the pin 20 at this time, idle operation of the first hook member 21 is only effected. Subsequently, the second hook member 34 which is engaged with the pin 45 arrives at the cam 46A and this second hook member 34 is liberated from the pin 45 in the manner described above. Accordingly, the pin 45 provided on the pulley carriage 13 is moved at a constant speed in the direction of arrow A, but the second mirror carriage 12 loses the drive force transmitted thereto from the pulley carriage 13 and stops moving. The pin 45 is further moved in the direction of arrow A and arrives at the position of the first hook member 33, whereby the first hook member 33 is connected to the pin 45 in the manner described above and the second mirror carriage 12 is connected to the pulley carriage 13. Thereafter, the drive pulley 24 starts to rotate in the direction of arrow C and the first mirror carriage 9, the second mirror carriage 12 and the pulley carriage 13 are moved in the direction opposite to the direction of arrow A to terminate the idle scanning, and each carriage returns to its forward movement starting position. In one-to-one magnification copying mode, the forward movement starting positions of the second mirror and the second mirror carriage are the positions indicated by solid line in FIG. 6A.

After the change of the length of the light path by the above-described copying mode changing operation has been terminated, the motor RM effects forward rotation for the scanning of the original and rotatively drives the pulley 24 in the direction B. By this, the drum D is slit exposed to the original image at the selected magnification, whereby a desired copy is formed on the drum. The pulley 24 is driven by the clutch-gear mechanism T at a rotational velocity which can move the first mirror 3 forward at a velocity equal to the peripheral velocity of the drum D divided by the selected magnification.

Figure 7A:
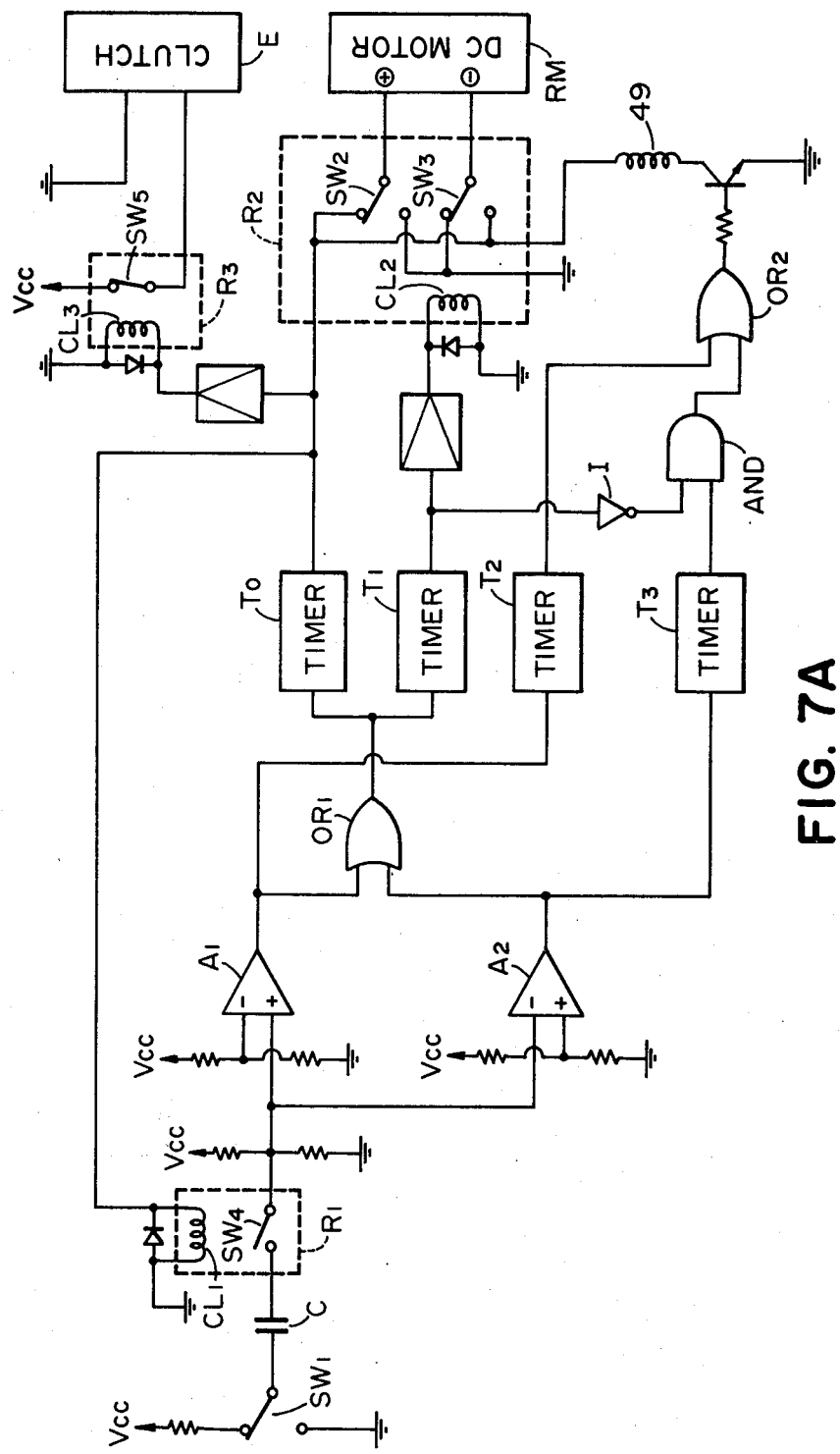
FIG. 7A illustrates the control circuit of the FIG. 6A device.

Reference is now had to FIGS. 7A and 7B to describe an example of the control means of the motor RM and solenoid 49 for changing the copying mode of the apparatus of FIGS. 6A and 6B.

Switches $SW_1$, $SW_2$ and $SW_3$ are similar to those described in connection with FIG. 5. To change the copying mode from the reduction copying mode to the one-to-one magnification copying mode, the switch $SW_1$ is closed at its upper contact. At this time, a capacitor C generates a positive start pulse, which is applied through a normally closed switch $SW_4$ to a comparator A1. Upon receipt of such pulse, the comparator A1 generates a shot pulse, which is applied through a timer $T_2$ and OR gate OR1 to timers $T_0$ and $T_1$. Each timer shown is such that it forms a high level output during the time shown in FIG. 7B from the point of time whereat it has received the shot pulse and that its output is zero during the other time. The timer $T_0$ maintains a high level output until the aforementioned reciprocal idle scanning is completed, and this output operates the coil $CL_1$ of a relay $R_1$ to open the switch $SW_4$ and also energizes the coil $CL_3$ of a relay $R_3$ to close a normally open switch $SW_5$. Upon closing of this switch $SW_5$, a clutch E contained in the mechanism T is operated. The clutch E may be one for one-to-one magnification copying or one for reduction copying and in any case, the DC motor RM and the pulley 24 are connected by the operation of the clutch E. On the other hand, the output of the timer $T_0$ is also applied to the contact side of a relay $R_2$.

The aforementioned shot pulse is applied to the timer $T_1$, which forms a high level output for the time required for the aforementioned forward idle scanning and thereby energizes the coil $CL_2$ of the relay $R_2$ and therefore, as described in connection with FIG. 5, a forward voltage is applied to the DC motor RM, which thus effects forward rotation. By this, the pulley 24 is rotated in the direction of arrow B.

The aforementioned shot pulse is also applied to the timer $T_2$, which forms a high level out from the point of time whereat it has received this pulse till the point of time whereat the first and second hook members 33 and 34 have passed the cam 46A in the forward movement direction. When the timer $T_2$ puts out the high level output, this output is applied to the plunger 49 through an OR gate $OR_2$. Thus, the cam 46A juts out into the movement path of the hook members, as previously described. After the first hook member 33 has been connected to the pin 45, the timer $T_1$ is deenergized and the coil $CL_2$ is deenergized and therefore, the rotation of the motor RM is reversed as described in connection with FIG. 5, whereby the first and second mirrors return to their forward movement starting points and the timer to $T_0$ is deenergized. Thus, the copying mode change is terminated.

To change the copying mode from the one-to-one magnification copying mode to the reduction copying mode, the selector switch $SW_1$ is closed at its lower contact. Thereby, the capacitor C generates a negative short pulse, which is applied to a comparator A2 through the switch $SW_4$ which has again been closed after the termination of the previous mode changing operation. Upon receipt of the aforementioned pulse, the comparator A2 forms a shot pulse. This shot pulse is applied to the timers $T_0$ and $T_2$ through the OR gate OR1. By the timers $T_0$ and $T_1$, the aforementioned reciprocal idle scanning is effected once.

The above-mentioned shot pulse is also applied to a timer $T_3$. The timer $T_3$ forms a high level output from the point of time whereat the shot pulse has been applied thereto until the second hook member 34 and the first hook member 33 have passed the cam 46A in the backward movement direction by the reversal of the rotation of the motor RM. This output of the timer $T_3$ is applied to an AND gate, to which the output from the timer $T_1$ is also applied through an inverter I. Accordingly, the AND gate puts out a high level signal which continues from after the point of time whereat the pulley 24 has started to rotate in the direction of arrow C till the point of time whereat the hook members 34 and 33 have passed the cam 46A. This output from the AND gate is applied through the OR gate OR2 to the plunger 49 to operate this plunger 49. By the operation of the plunger 49, the first hook member 33 is liberated from the pin 45 as previously noted, and the pin 45 is connected to the second hook member 34. Therefore, when the first and second mirrors return to their forward movement starting positions, the timer $T_0$ is deenergized, thus terminating the copying mode changing operation.

By suitably setting the operating time of the timers $T_0$ and $T_1$, the idle scanning movement distance of each carriage can be made shorter than the movement distance required during original scanning. Also, the operating time of the timers $T_0$ and $T_1$ may be changed in the case of the change from the one-to-one magnification copying mode to the reduction copying mode and the change from the reduction copying mode to the one-to-one magnification copying mode, and the idle scanning distance may be made into a necessary minimum as by changing the idle scanning distance in accordance with the type of mode change. Alternatively, the point of time whereat the timer $T_2$ starts to operate may be set to a point of time after the first hook member 33 has passed the position of the cam 46A is the forward movement direction. Also, the point of time whereat the timer $T_3$ starts to operate may be set to a point of time after the second hook member 34 has passed the position of the cam 46A in the backward movement direction. In any case, only the hook member that is connected to the pin 45 is acted on by the cam 46A and the hook member that is not connected to the pin 45 is not acted on by the cam 46A.

Figure 8A:
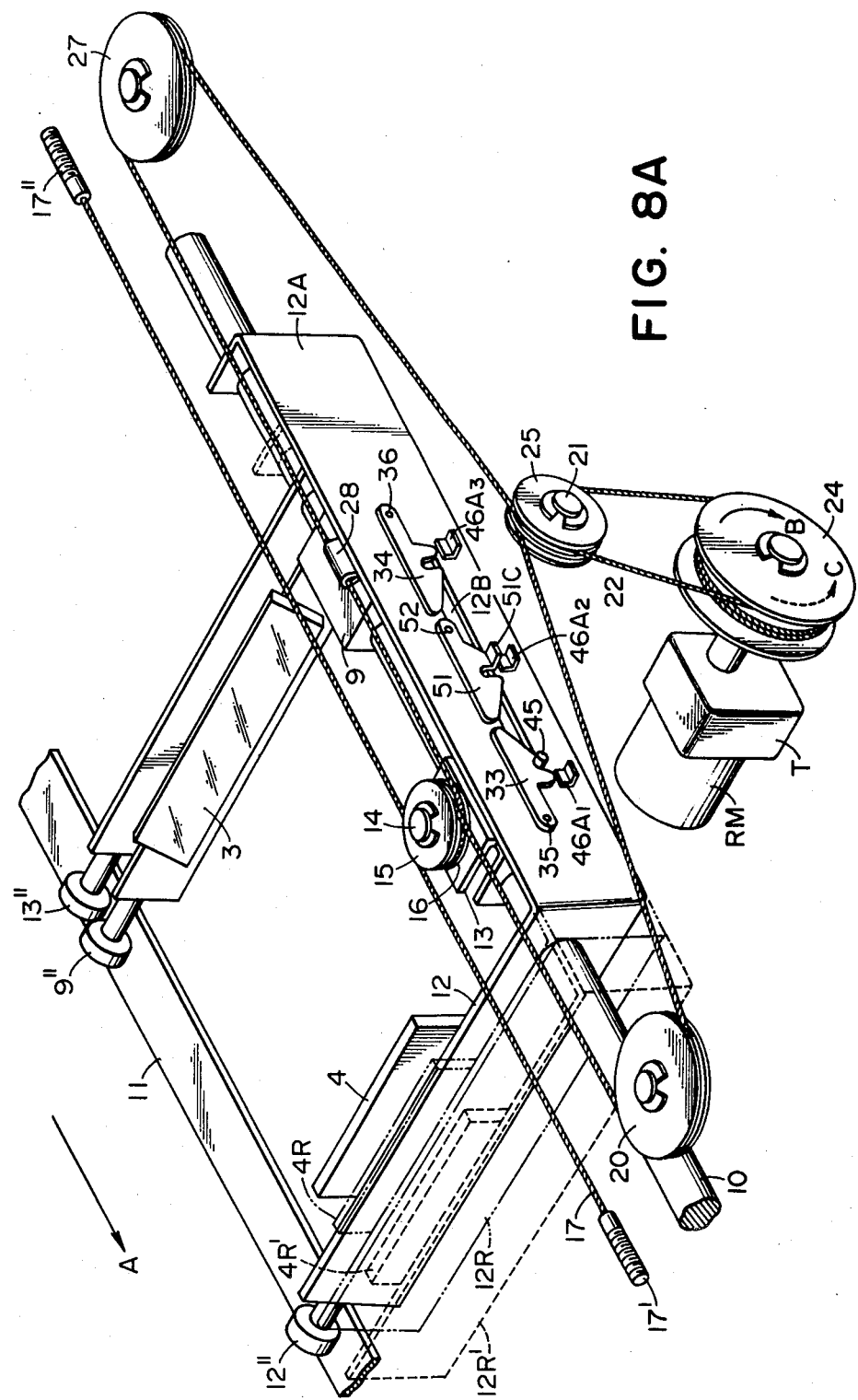
FIG. 8A illustrates the scanning device according to still another embodiment of the present invention.
Figure 8B:
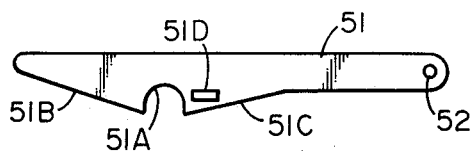
FIG. 8B is a side view of a member of the FIG. 8A device.

Reference is now had to FIGS. 8A and 8B to describe a scanning device in which the length of the light path can be changed in three stages, namely, a scanning device which can realize three different copying magnifications.

The pin 45 studded in the pulley carriage 13 is projected from a slot 12B formed in the side plate 12A of the second mirror carriage 12 along the guide shaft 10 to the exterior of the side plate 12A. On the side plate 12A, hook members 33 and 34 similar to those already described are pivotally mounted by means of shafts 35 and 36, respectively. Between the hook members 33 and 34, a hook member 51 configured as shown in FIG. 8B is pivotally mounted on the side plate 12A by means of a shaft 52. The hook member 51 has a hook groove 51A and inclined surface portions 51B and 51C on the opposite sides of the hook groove. A protruded portion 51D is secured to a side surface of the hook member 51. The inclined surface portions 51B and 51C of the hook member 51 are similar in function to the inclined surface portions of the hook members 33 and 34. Also, the groove 51A of the hook member 51 is similar in function to the hook grooves of the hook members 33, 34. The protruded portion 51D of the hook member 51 is also similar in function to the protruded portions of the hook members 33 and 34. However, in the present example, a cam for acting on the protruded portion of each hook member is provided for each hook member. That is, a cam $46A_1$ normally bears against the protruded portion 33B of the hook member 33, a cam $46A_2$ normally bears against the protruded portion 51D of the hook member 51, and a cam $46A_3$ normally bears against the protruded portion 34B of the hook member 34. The cam $46A_2$ is disposed outside of the movement path of the pin 45 so as not to interfere with the movement of the pin 45 along the guide shaft 10. In the present example, each hook member has a habitude of downwardly pivoting about a corresponding axis due not to a spring but to mere gravity. Springs as shown in FIGS. 6A and 6B may also be used. In any case, each cam $46A_1$, $46A_2$, $46A_3$ is moved up and down by mechanism comprising means 46 to 50 shown in FIG. 6A. When each cam is moved up, a hook member corresponding thereto is liberated from the pin 45. In this example, however, a support plate having secured thereto a plunger corresponding to each cam is fixed to the side plate 12A of the second mirror cartridge. For convenience of description, plungers for moving up and down the cams $46A_1$, $46A_2$ and $46A_3$ are called plungers 491, 492 and 493.

In FIG. 8A, the start positions of the second mirror and the second mirror carriage when the hook member 33 is connected to the pin 45 are positions 4 and 12 indicated by solid lines. At this time, an image of a first magnification can be formed. The start positions of the second mirror and the second mirror carriage when the hook member 51 is connected to the pin 45 are positions 4R and 12R. At this time, an image of a second magnification smaller than the first magnification can be obtained. The start positions of the second mirror and the second mirror carriage when the hook member 34 is connected to the pin 45 are positions 4R' and 12R'. At this time, an image of a third magnification smaller than the second magnification can be obtained.

In changing the copying mode, as described in connection with FIGS. 6A and 6B, idle scanning is effected once, whereby the length of the light path between the original and the lens is changed to a length corresponding to a selected magnification, whereafter original scanning is started.

The copying mode changing operation will be described in detail.

Where magnification is to be changed from the first magnification in which the pin 45 is engaged with the first hook member 33 to the second magnification in which the pin 45 is engaged with the second hook member 51, none of the cams is operated during the idle scanning forward movement of each carriage but the plunger 491 is operated during the backward movement of each carriage to operate the first cam $46A_1$ alone and the pin 45 is liberated from the first hook member 33 to stop the movement of the second carriage 12, whereafter the pin 45 is brought into engagement with the second hook member 51 by movement of the pulley carriage 13. By this, the pulley carriage 13 and the second mirror carriage 12 are made into a unit. The magnification change is effected so that exposure scanning at the second magnification is effected upon termination of this idle scanning.

When magnification is to be changed from the first magnification to the third magnification in which the pin 45 is engaged with the third hook member 34, none of the cams is operated during the aforementioned idle scanning forward movement, but the plungers 491 and 492 are operated during the backward movement to operate the first cam $46A_1$ and the second cam $46A_2$ and the pin 45 is liberated from the first hook member 33 to stop the movement of the second mirror carriage 12, whereafter the pin 45 is brought into engagement with the third hook member 34 by movement of the pulley carriage 13. By this, the pulley carriage 13 and the second mirror carriage 12 are made into a unit. By the termination of this idle scanning, magnification is changed to the third magnification.

Where magnification is to be changed from the second magnification to the first magnification, the plunger 492 is operated during the aforementioned idle scanning forward movement to operate the second cam $46A_2$ alone, whereby the pin 45 is disengaged from the second hook member 51 and brought into engagement with the first hook member 33, thus changing magnification to the first magnification.

Where magnification is to be changed from the second magnification to the third magnification, none of the cams is operated during the aforementioned idle scanning forward movement, but the plunger 492 is operated during the backward movement to operate the second cam $46A_2$ alone, whereby the pin 45 is liberated from the second hook member 51 and brought into engagement with the third hook member 34, thus changing magnification to the third magnification.

Where magnification is to be changed from the third magnification to the first magnification, the plungers 493 and 492 are operated during the aforementioned idle scanning forward movement to operate the third cam $46A_3$ and the second cam $46A_2$, whereby the pin 45 is liberated from the third hook member 34 and brought into engagement with the first hook member 33, and during the backward movement, none of the plungers is operated, thus changing magnification to the first magnification.

Where magnification is to be changed from the third magnification to the second magnification, the plunger 493 is operated during the aforementioned idle scanning forward movement to operate the third cam 46A$_3$ alone, whereby the pin 45 is liberated from the third hook member 34 and brought into engagement with the second hook member 51, and during the backward movement, none of the plungers is operated, thus changing magnification to the second magnification.

Figure 9A:
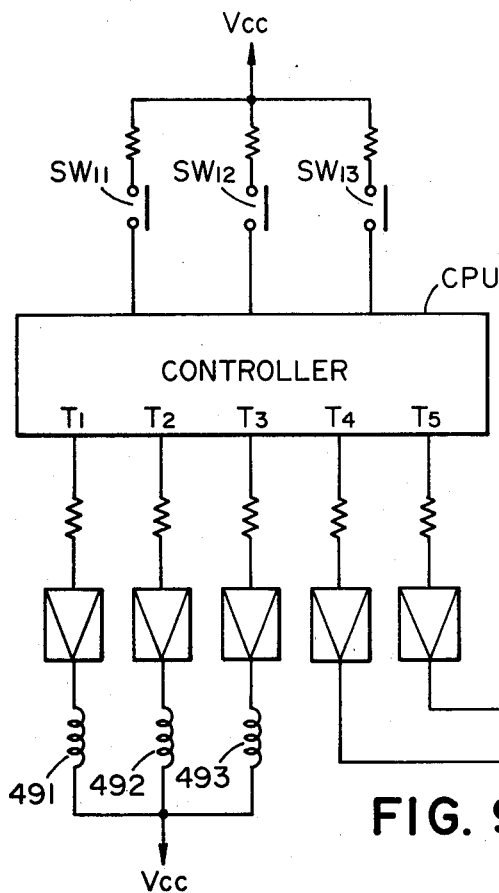
FIG. 9A illustrates the control circuit of the FIG. 8A device.
Figure 9B:
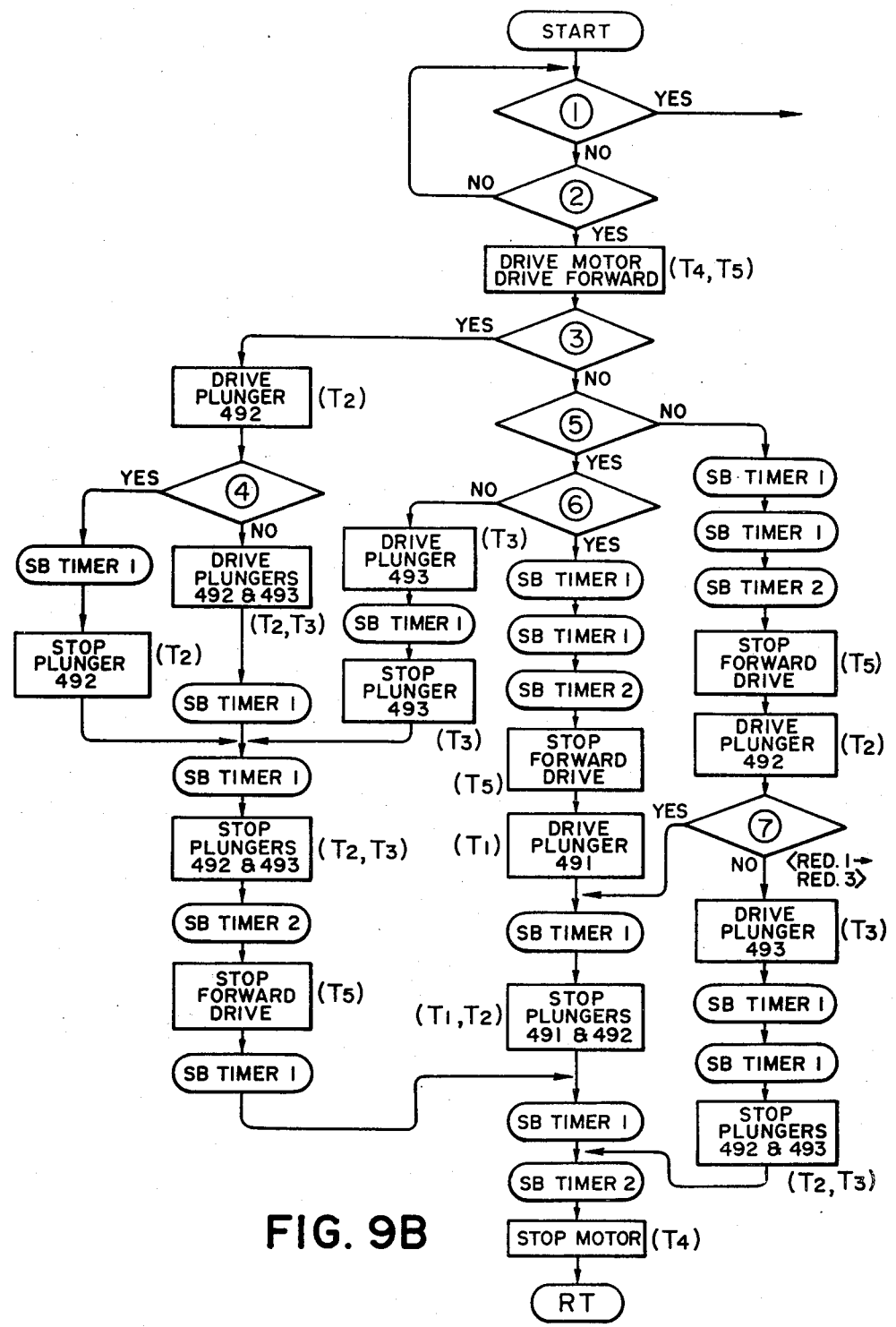
FIG. 9B is a flow chart of the controller of FIG. 9A.

The control of the operations of the DC motor RM and plungers 491, 492, 493 in the present example can be carried out by the means of FIG. 9A. In FIG. 9A, SW$_{11}$, SW$_{12}$ and SW$_{13}$ are first, second and third magnification selecting key switches. The signal from each key switch is applied as input to a controller CPU which is, for example, a one-chip microcomputer, and in accordance with the flow chart of FIG. 9B and the timing chart of FIG. 9C, the controller CPU controls the aforementioned plungers 491, 492, 493 and DC motor RM to change the copying mode to a mode selected by said switch. That is, the plungers 491, 492 and 493 are connected to the output terminals T$_1$, T$_2$ and T$_3$, respectively, of the controller CPU through a driver circuit, and the output terminal T$_4$ of the controller CPU is coupled through a motor driving circuit to the contacts of switches SW$_2$ and SW$_3$ which are similar to those described in connection with FIG. 5, with the output terminal T$_5$ of the controller CPU being coupled to the coil CL of relay R through the driver circuit.

When operation of the controller CPU is started, whether or not the copying is to be started is discriminated at step ①  and in case where the copying is to be started, the well-known copying operation control is started, but in case where copying mode change is instructed, whether or not the magnification selecting key has been depressed is discriminated at step ②. When it has been judged thereby that the magnification selecting key has been changed over, a signal is put out from the terminal T$_4$ and also a signal is put out from the terminal T$_5$. The coil CL is energized by the signal from the terminal T$_5$ and the switches SW$_2$ and SW$_3$ are operated in the same manner as that described in connection with FIG. 5, and the DC motor RM effects forward rotation, so that the drive pulley 24 is rotated in the direction of arrow B. Next, whether or not the key SW$_{11}$ has been selected is judged at step ③. If the key SW$_1$ has been selected, the terminal T$_2$ puts out a signal to operate the plunger 492. Next, whether or not magnification is to be changed from the second magnification to the first magnification is judged at step ④ and if so, an SB timer 1 contained in the controller CPU is operated and after at time t$_1$ has elapsed, the output of the terminal T$_2$ is discontinued to deenergize the plunger 492. Thereafter, the SB timer 1 and an SB timer 2 also contained in the controller CPU are successively operated, whereby a time (t$_1$+t$_2$) elapses, whereupon the signal of the terminal T$_5$ is discontinued and the switches SW$_2$ and SW$_3$ of relay R are changed over to their lower contacts, whereupon the motor RM reverses its direction of rotation. Thus, the pulley 24 starts to rotate in the direction of arrow C. Thereafter, the SB timer 1 and the SB timer 2 are successively operated twice and once, respectively, and after the lapse of a time (2×t$_1$+t$_2$), the output of the terminal T$_4$ is discontinued to stop the driving of the motor RM.

On the other hand, when it has been judged at step ④ that the key SW$_{13}$ has been changed over to SW$_{11}$, signals are put out at the terminals T$_2$ and T$_3$ to operate the plungers 492 and 493 and the SB timer 1 is operated twice after the lapse of a time (2×t$_1$), the outputs of the terminals T$_2$ and T$_3$ are discontinued to deenergize the plungers 492 and 493. Subsequently, the SB timer 2 is operated to discontinue the output of the terminal T$_5$. The subsequent process is the same as that when the key SW$_{12}$ has been changed over to the key SW$_{11}$.

If it has been judged at step ③ that the key SW$_{11}$ has not been selected, whether or not the key SW$_{12}$ has been selected is judged at step ⑤ and if so, whether or not the key has been changed over from SW$_{11}$ to SW$_{12}$ is judged at step ⑥. If it is judged that the key has not been changed over from SW$_{11}$ to SW$_{12}$ but the key has been changed over from SW$_{13}$ to SW$_{12}$, a signal is put out at the terminal T$_3$ to operate the plunger 493. Next, when the SB timer 1 is operated and a time t$_1$ elapses, the signal of the terminal T$_3$ is discontinued to deenergize the plunger 493. Thereafter, a process similar to what has been previously described with respect to the process passing through step ④ takes place.

On the other hand, when it is judged at step ⑥ that the key has been changed over from SW$_{11}$ to SW$_{12}$, the SB timer 1 and the SB timer 2 are operated twice and once, respectively, and after a time (2×t$_1$+t$_2$) has been elapsed, the output of the terminal T$_5$ is discontinued and the motor RM is changed from the forward rotation to the backward rotation. Thus, the pulley 24 starts to rotate in the direction C while, at the same time, a signal is put out from the terminal T$_1$ to operate the plunger 491. Subsequently, by operation of the SB timer 1, the signal of the terminal T$_1$ is discontinued after the lapse of a time t$_1$. Thereafter, the SB timer 1 and the SB timer 2 are successively operated and when a time (t$_1$+t$_2$) elapses, the output of the terminal T$_4$ is discontinued. Thus, the rotation of the motor RM is stopped and the rotation of the pulley 24 is stopped.

Also, when it has been judged at step ⑤ that the key SW$_{12}$ has not been selected, in other words, the key SW$_{13}$ has been selected, then the SB timer 1 and the SB timer 2 are operated twice and once, respectively, and after the lapse of a time (2×t$_1$+t$_2$), the output of the terminal T$_5$ is discontinued and the motor RM starts its backward rotation while, at the same time, a signal is put out at the terminal T$_2$ to operate the plunger 492. Next, whether or not the key has been changed over from SW$_{12}$ to SW$_{13}$ is judged at step ⑦ and if so, the SB timer 1 is operated and after the lapse of a time t$_1$, the output of the terminal T$_2$ is discontinued to stop the operation of the plunger 492. Subsequently, the SB timer 1 and the SB timer 2 are successively operated and after the lapse of a time (t$_1$+t$_2$), the output of the terminal T$_4$ is discontinued to stop the motor RM.

On the other hand, when it is judged at step ⑦ that the key has not been changed over from SW$_{12}$ to SW$_{13}$, in other words, the key has been changed from SW$_{11}$ to SW$_{13}$, then a signal is put out at the terminal T$_3$ to operate the plunger 493. The SB timer 1 is then operated and after the lapse of a time (2×t$_1$), the signals of the terminals T$_2$ and T$_3$ are discontinued to deenergize the plungers 492 and 493. Then, by operation of the SB timer 2, after the lapse of a time t$_2$, the signal of the terminal T$_4$ is discontinued to stop the rotation of the motor RM.

Thus, the length of the light path between the original and the lens is changed to a length of light path corresponding to the selected magnification. If the operating time $t_2$ of the SB timer is suitably selected, the idle scanning movement distance of each carriage can be made shorter than the movement distance required for the original scanning.

In the above-described embodiments shown in FIG. 6A and so forth, the plurality of hook members may preferably be disposed side by side in the direction along the guide shaft 10, in other words, in the direction along the direction of relative movement of the second mirror carriage 12 and the pulley carriage 13.

Also, in the embodiments of FIG. 6A and so forth, the plurality of hook members are provided on the second mirror carriage 12 and the pin 45 is provided on the pulley carriage 13, whereas alternatively the pin 45 may be provided on the second mirror carriage 12 and the plurality of hook members may be provided on the pulley carriage 13.

Figure 10:
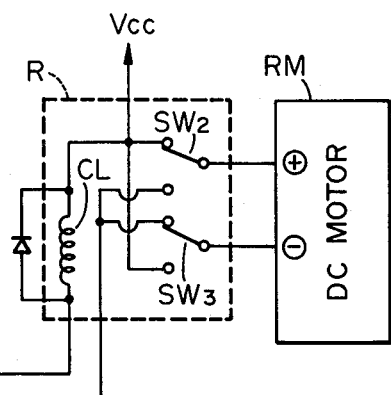
FIG. 10 is a side view of a portion of a further embodiment of the present invention.
Figure 10:
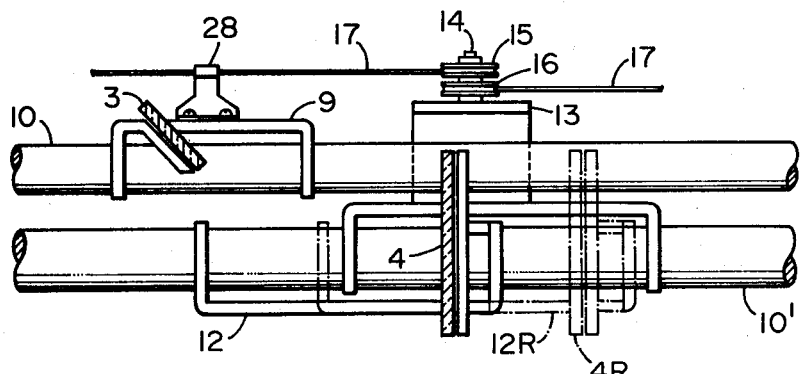

Although, in the above-described embodiments, the common shaft 10 is employed as the guide shaft for the second mirror carriage 12 and the first mirror carriage, distinct guide shafts 10 and 10' may be employed as shown in FIG. 10. That is, in FIG. 10, the first mirror carriage 9 is supported and guided by the guide shaft 10 and the second mirror carriage 12 and the pulley carriage 13 are supported and guided by the guide shaft 10' which is parallel to the guide shaft 10. In the construction of FIG. 10, as compared with the constructions of the above-described embodiments, the interference between the first mirror carriage 9 and the second mirror carriage 12 and the pulley carriage 13 during the original exposure and scanning can be more easily prevented and this leads to the possibility of making the apparatus more compact.

Also, the first mirror carriage 9 and the pulley carriage 13 may be supported and guided by the shaft 10 and the second mirror carriage 12 may be supported and guided by the guide shaft 10'.

Figure 11:
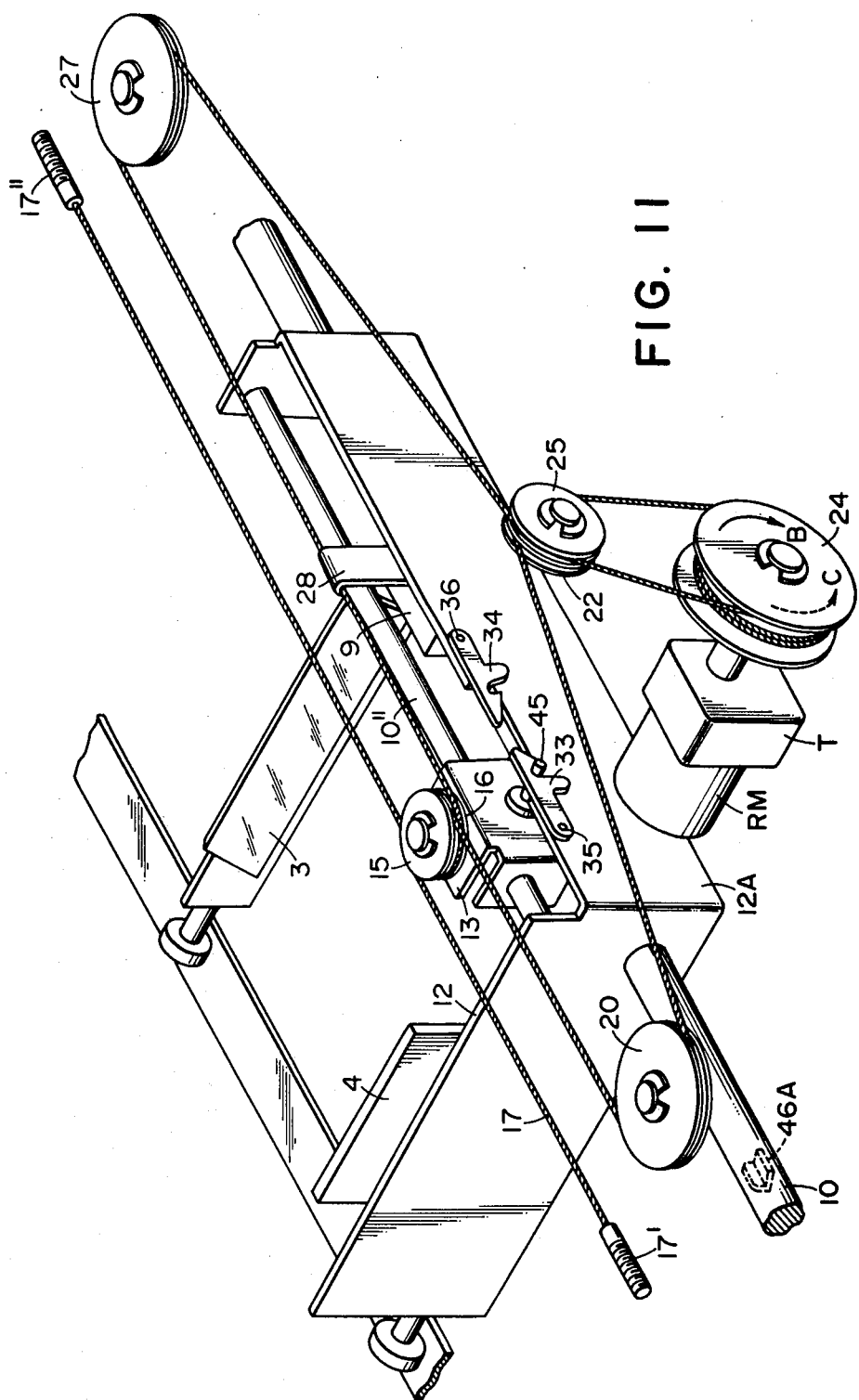
FIG. 11 illustrates the scanning device according to a further embodiment of the present invention.

In an embodiment shown in FIG. 11, the first and second mirror carriages 9 and 12 are supported and guided by a guide shaft 10 and the pulley carriage 13 is supported and guided by a guide shaft 10" secured to the second mirror carriage 12 in parallelism to the shaft 10. Again in the embodiment of FIG. 11, the pulley carriage 13 is movable relative to the second mirror carriage 12 lengthwisely of the shafts 10, 10' and therefore operates in the same manner as the previously described embodiments. The embodiment of FIG. 11 is one in which the guide means for the carriage 13 in the embodiment of FIGS. 6A and 6B has been modified, but in the embodiment described in connection with FIG. 2 or the embodiment described in connection with FIGS. 8A and 8B, the guide means for the carriage 13 may be constructed like the guide shaft 10" of FIG. 11.

In the above-described embodiments, the second mirror carriage and the pulley carriage are separate from each other and when the connecting means is in its released condition, one of them is movable relative to the other. However, the shaft 14 of the pulleys 15, 16 may be secured to the second mirror carriage 12 while, on the other hand, the wire 17 may be secured to the carriage 13 by means of a securing member 28 and also the first mirror carriage 9 may be connected to this securing member and the carriage 13 by the aforementioned various connecting means, whereby the mutual connected positional relation between the carriage 9 and the carriage 13 may be changed. Again in this case, the length of the light path between the original and the lens can be changed correspondingly to a selected magnification, but in this case the start position of the first mirror will be changed for each magnification. Accordingly, the time from the start of the first mirror till the start of the original scanning varies for each manufacturing and therefore, the transfer medium feed start timing may preferably be changed for each magnification to ensure coincidence between the toner image on the drum D and the transfer medium.

Also, in the above-described embodiments, a so-called in-mirror lens is employed as the lens. In a variable magnification image formation apparatus using an in-mirror lens, the amount of movement of the lens during magnification changing operation is considerably greater than the amount of movement of the lens in an apparatus using a so-called through-lens and therefore, the amount of movement of the mirror is also considerably greater. Accordingly, the present invention is particularly effectively applicable to a variable magnification image formation apparatus using such an in-mirror lens, but of course the present invention is also applicable to an apparatus using a through-lens.

Although, in the above-described embodiments, two original scanning mirrors are used, design may be made such that three or more mirrors are moved to scan the original. In such case, a plurality of mirrors will be supported on one or both of the carriages 9 and 12.

The present invention is also applicable to an apparatus which effects enlargement copying.

What we claim is:

1. A scanning type image formation apparatus for selectively forming images of different magnifications, comprising:

original supporting means for supporting an original thereon;

scanning means for scanning the original;

an electrophotographic photosensitive medium movable along a predetermined endless path; and a lens for forming on said photosensitive medium the image of the original scanned by said scanning means;

said scanning means being provided with:

first and second reflecting means for reflecting the light from the original into a light path in which the lens is disposed;

first carriage means for supporting said first reflecting means;

second carriage means for supporting said second reflecting means;

first guide means for supporting and guiding said first carriage means so as to be movable parallel to said original supporting means for the scanning of the original;

second guide means for supporting and guiding said second carriage means so as to be movable parallel to said original supporting means for the scanning of the original;

a moving member movable relative to said first and second carriage means and said original supporting means;

third guide means for supporting and guiding said moving member so as to be movable parallel to said original supporting means;

first connecting means for fixing said second carriage means to said moving member in such a manner that during a magnification changing operation the relative fixed positional relation therebetween can be changed;

drive means for selectively forming a forward drive force and a backward drive force;

drive force transmitting wire means connected to said drive means;

second connecting means for connecting said wire means to said first carriage means and said moving member so that said first carriage means and said moving member are reciprocally moved at different velocities by the drive force formed by said drive means, said first and second reflecting means scanning the original during the forward movement thereof; and magnification changing means for controlling said first connecting means and changing the relative fixed positional relation between said second carriage means and said moving member correspondingly to a selected magnification to change the length of the light path between the original and the lens correspondingly to the selected magnification.

2. An apparatus according to claim 1, wherein said first connecting means includes:

a rotatable member provided on one of said second carriage means and said moving member; and a connecting member provided on the other of said second carriage means and said moving member and engaged with said rotatable member so as to be moved by rotation of said rotatable member; and said magnification changing means has means for rotating said rotatable member correspondingly to the selected magnification during magnification change.

3. An apparatus according to claim 1, wherein said first connecting means includes a connecting member provided on one of said second carriage means and said moving member, and a plurality of engaging members provided on the other of said second carriage means and said moving member so as to be selectively engageable with said connecting member, and said magnification changing means includes releasing means for releasing the engagement between one of said plurality of engaging means and said connecting member during magnification chaning operation, and means for operating said drive means so as to move said moving member along third guide means to bring the other of said plurality of engaging members corresponding to the selected magnification into engagement with said connecting member after the engagement between said one engaging member and said connecting member is released.

4. An apparatus according to claim 3, wherein said plurality of engaging members are arranged side by side on the other of said second carriage means and said moving member along the direction of relative movement of said moving member and said second carriage means, and said releasing means has a releasing member and means for selectively putting said releasing member into and out of the movement path of said plurality of engaging members and wherein the engaging member engaged with said connecting member bears against said releasing member projected into said movement path and is thereby spaced apart from said connecting member.

5. An apparatus according to claim 4, wherein said plurality of engaging members are provided on said second carriage means and said connecting member is provided on said moving member.

6. An apparatus according to claim 1, 2, 3, 4 or 5, wherein said first and second guide means are identical.

7. An apparatus according to claim 1, 2, 3, 4 or 5, wherein said second and third guide means are identical.

8. An apparatus according to claim 1, 2, 3, 4 or 5, wherein said first, second and third guide means are identical.

9. An apparatus according to claim 1, 2, 3, 4 or 5, wherein one of said second guide means and said third guide means is provided on a member guided by the other of said second guide means and said third guide means.

10. An apparatus according to claim 1, 2, 3, 4 or 5, wherein said second connecting means includes:

pulley means which is journalled to one of said first carriage means and said moving member, and over which said wire member is passed; and fixing means for fixing said wire means to the other of said first carriage means and said moving member.

11. An apparatus according to claim 10, wherein said pulley means has a first and a second pulley and said wire means is passed over said first and second pulleys from the opposite directions.

12. An apparatus according to claim 10, wherein said pulley means is provided on said moving member.

13. An apparatus according to claim 1, 2, 3, 4 or 5, wherein provision is made of means for changing the relation between the output velocity of said drive means and movement velocity of said electrophotographic photosensitive medium in accordance with the sealed magnification.

14. An apparatus according to claim 10, wherein provision is made of means for changing the relation between the output velocity of said drive means and the movement velocity of said electrophotographic photosensitive medium in accordance with the selected magnification.

15. A scanning type image formation apparatus for selectively forming images of different magnifications, comprising:

original supporting means for supporting an original thereon;

scanning means for supporting an original thereon;

a lens for forming on a photosensitive medium the image of the original scanned by said scanning means;

said scanning means being provided with:

first and second reflecting means for reflecting the light from the original into a light path in which the lens is disposed;

first carriage means supporting said first reflecting means and movable relative to said original supporting means to scan the original;

second carriage means supporting said second reflecting means and movable relative to said original supporting means to scan the original;

a moving member movable relative to said first and second carriage means and said original supporting means;

first connecting means for connecting said second carriage means to said moving member in such a manner that, during exposure scanning operation, said moving member and said second carriage means can move at the same velocity;

drive source means;

flexible means for transmitting the drive force from said drive source means;

second connecting means for connecting said flexible means to said first carriage means;

third connecting means for connecting said flexible means to said movable member in such a manner that said movable member moves at a different velocity from the velocity of said first carriage means; and magnification changing means for changing, during magnification changing operation, the relative positional relationship between said second carriage means and said moving member correspondingly to a selected magnification to change the length of the light path between the original and the lens correspondingly to the selected magnification.

16. An apparatus according to claim 15, wherein said first connecting means includes:

a rotatable member provided on one of said second carriage means and said moving member; and a connecting member provided on the other of said second carriage means and said moving member and engaged with said rotatable member so as to be moved by rotation of said rotatable member; and said magnification changing means has means for rotating said rotatable member correspondingly to the selected magnification during magnification changing operation.

17. An apparatus according to claim 15, wherein said first connecting means includes:

a connecting member provided on one of said second carraige means and said moving member; and a plurality of engaging members provided on the other of said second carriage means and said moving member so as to be selectively engageable with said connecting member; and said magnification changing means includes:

releasing means for releasing the engagement between one of said plurality of engaging members and said connecting member; and means for operating said drive source means before exposure scanning operation so as to reciprocate said moving member.

18. An apparatus according to claim 17, wherein said plurality of engaging members are arranged side by side on the other of said second carriage means and said moving member along the direction of relative movement of said moving member and said second carriage means, and said releasing means has a releasing member and means for selectively putting said releasing member into and out of the movement path of said plurality of engaging members and wherein the engaging member engaged with said connecting member bears against said releasing member projected into said movement path and is thereby spaced apart from said connecting member.

19. An apparatus according to claim 18, wherein said plurality of engaging members are provided on said second carriage means and said connecting member is provided on said moving member.

20. An apparatus according to claim 15, 16, 17, 18 or 19, wherein said second connecting means fixes said flexible means to said first carriage means, and said third connecting means includes a pulley over which said flexible means is passed and which is journalled to said moving member.

21. An apparatus according to claim 15, 16, 17, 18 or 19, wherein said second connecting means includes a pulley over which said flexible means is passed and which is journalled to said first carriage means, and said third connecting means fixes said flexible means to said moving member.

* * * * *

UNITED STATES PATENT AND TRADEMARK OFFICE
CERTIFICATE OF CORRECTION

PATENT NO. : 4,402,595

DATED : September 6, 1983

INVENTOR(S) : HIROSHI OGAWA, ET AL.

It is certified that error appears in the above-identified patent and that said Letters Patent is hereby corrected as shown below:

Column 11, line 56, "cartridge" should read --carriage--.

Column 18, line 46, Claim 15, should read --scanning means for scanning the original; and--.

Signed and Sealed this

Fourteenth Day of February 1984

[SEAL]

Attest:

GERALD J. MOSSINGHOFF

Attesting Officer   Commissioner of Patents and Trademarks